United States Patent
Hua et al.

(10) Patent No.: US 11,398,746 B2
(45) Date of Patent: Jul. 26, 2022

(54) INFORMATION PROCESSING METHOD, MOBILE DEVICE AND STORAGE MEDIUM

(71) Applicant: BEIJING XIAOMI MOBILE SOFTWARE CO., LTD., Beijing (CN)

(72) Inventors: Chengping Hua, Beijing (CN); Xuan Ma, Beijing (CN); Zheng Li, Beijing (CN); Shipeng Wang, Beijing (CN); Peng Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 178 days.

(21) Appl. No.: 16/848,127

(22) Filed: Apr. 14, 2020

(65) Prior Publication Data

US 2021/0159716 A1    May 27, 2021
US 2022/0200321 A9    Jun. 23, 2022

(51) Int. Cl.
*H02J 7/00*        (2006.01)
*H02J 7/02*        (2016.01)
(Continued)

(52) U.S. Cl.
CPC ............. *H02J 7/02* (2013.01); *B25J 11/0085* (2013.01); *H02J 7/00032* (2020.01);
(Continued)

(58) Field of Classification Search
CPC .......... H02J 7/02; H02J 7/00032; H02J 50/60; H02J 50/15; H02J 50/20; H02J 50/30; H02J 7/00; B25J 11/0085; H04W 4/00
(Continued)

(56) References Cited

U.S. PATENT DOCUMENTS

| | | | |
|---|---|---|---|
| 9,492,922 B1 | 11/2016 | Johnson et al. | |
| 2009/0243397 A1* | 10/2009 | Cook | H01Q 7/00 307/104 |

(Continued)

FOREIGN PATENT DOCUMENTS

| | | |
|---|---|---|
| CN | 102097848 A | 6/2011 |
| CN | 102792552 A | 11/2012 |

(Continued)

OTHER PUBLICATIONS

Extended European Search Report dated Jul. 10, 2020 in corresponding European Patent Application No. 20171481.3, 7 pages.

*Primary Examiner* — Zixuan Zhou
(74) *Attorney, Agent, or Firm* — Oblon, McClelland, Maier & Neustadt, L.L.P.

(57) ABSTRACT

Aspects of the disclosure provide an information processing method and apparatus, a mobile device and a storage medium. The method can be applied to a mobile device including a movable chassis, and includes acquiring a charging request from an intelligent device associated with the mobile device, and determining whether there is a living body in the movement space of the mobile device. The method can further include, responsive to determining that there is no living body in the movement space of the mobile device, enabling a wireless charging function and performing wireless charging of the intelligent device having the charging request. Through this method, the intelligent degree of the mobile device can be improved.

17 Claims, 3 Drawing Sheets

(51) Int. Cl.
- *H02J 50/60* (2016.01)
- *B25J 11/00* (2006.01)
- *H02J 50/15* (2016.01)
- *H02J 50/20* (2016.01)
- *H02J 50/30* (2016.01)

(52) U.S. Cl.
CPC ............ *H02J 50/60* (2016.02); *H02J 50/15* (2016.02); *H02J 50/20* (2016.02); *H02J 50/30* (2016.02)

(58) Field of Classification Search
USPC .......................................... 320/108; 307/104
See application file for complete search history.

(56) References Cited

U.S. PATENT DOCUMENTS

| | | | |
|---|---|---|---|
| 2018/0105054 A1* | 4/2018 | Fan | .................. H02J 7/342 |
| 2018/0120794 A1 | 5/2018 | Cheng et al. | |
| 2018/0301937 A1 | 10/2018 | Park et al. | |

FOREIGN PATENT DOCUMENTS

| | | |
|---|---|---|
| CN | 204398907 U | 6/2015 |
| CN | 106037589 A | 10/2016 |
| CN | 107124046 A | 9/2017 |
| CN | 109950985 A | 6/2019 |
| EP | 2 962 890 A | 1/2016 |
| EP | 3 316 232 A1 | 5/2018 |

\* cited by examiner

INFORMATION PROCESSING METHOD, MOBILE DEVICE AND STORAGE MEDIUM

CROSS-REFERENCE TO RELATED APPLICATIONS

This application is based upon and claims priority to Chinese Patent Application 201911144282.1, filed on Nov. 20, 2019, the disclosure of which is hereby incorporated by reference in its entirety.

BACKGROUND

The Internet of Things (IOT) is an important part of the new generation of information technology, and is also an important stage for development of the "information" times. As its name implies, the Internet of Things refers to an Internet in which everything is mutually connected, which has the following two meanings. Firstly, the core and foundation of the LOT is still the Internet, and the IOT is an extended and expanded network based on the Internet. Secondly, the user end of the IOT is extended and expanded to information exchange and communication between any goods, i.e., connection of everything. The Internet of Things is widely used in the integration of networks through intelligent sensing, recognition technology, pervasive computing and other communication sensing technologies, and thus the ITO is also known as the third wave of the development of the world's information industry after computer and Internet.

Based on the development of Internet of Things technology, a variety of IOT devices have been emerged, including devices with automatic movement functions, such as mobile robots and sweeping robots. The emergence of these IOT devices with automatic movement functions has brought great convenience to people's life.

SUMMARY

The disclosure relates to the technical field of electronic equipment, in particular to an information processing method and apparatus, a mobile device, and a storage medium. Further aspects of the disclosure provide an information processing method and apparatus, a mobile device, and a storage medium.

According to a first aspect of the disclosure, the disclosure provides an information processing method, applied to a mobile device including a movable chassis. The method can include acquiring a charging request from an intelligent device associated with the mobile device, and determining whether there is a living body in a movement space of the mobile device. If there is no living body in the movement space of the mobile device, the method can include enabling a wireless charging function and performing wireless charging of the intelligent device having the charging request.

According to a second aspect of the disclosure, the disclosure provides an information processing apparatus, applied to a mobile device including a movable chassis. The apparatus can include an acquisition module configured to acquire a charging request from an intelligent device associated with the mobile device, and a determination module configured to determine whether there is a living body in the movement space of the mobile device. The apparatus can further include a wireless charging module configured to, if there is no living body in the movement space of the mobile device, enable a wireless charging function and perform wireless charging of the intelligent device having the charging request.

According to a third aspect of the disclosure, the disclosure provides a mobile device. The mobile device can include a processor and memory configured to store instructions executable by the processor. The process is configured to execute the information processing method in the first aspect.

According to a fourth aspect of the disclosure, the disclosure provides a storage medium having stored thereon instructions. The instructions, when being executed by a processor in a mobile device, enable the mobile device to implement the information processing method in the first aspect.

It should be understood that the above general description and the subsequent detailed description are only exemplary and explanatory and do not limit the disclosure.

BRIEF DESCRIPTION OF THE DRAWINGS

The accompanying drawings, which are incorporated in and constitute a part of this description, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The emergence of IOT devices has brought great convenience to people's life. For example, in the smart or intelligent home system, users use some intelligent home devices, which bring great convenience to life. For example, intelligent windows can be opened or closed automatically by sensing of the external environment through sensors. Further, intelligent voice devices can respond to the needs of users according to their voice input. Moreover, these IOT devices can also communicate with one another to realize associated control, such as control of an intelligent TV to switch between channels through a voice device.

However, along with the emergence of many IOT devices, the charging problem is difficult to solve. First, since power cables need to be used for charging, or batteries need to be replaced, the convenience is not good. Second, it is difficult to locate which IOT device needs battery replacement In this regard, the embodiment of the disclosure provides an information processing method so as to solve at least some of the problems mentioned above.

The embodiment of the disclosure provides an information processing method, that can include performing a predetermined function in a movement process of the mobile device via a movable chassis, and enabling a wireless charging function in the movement process, where the wireless charging function is different from the predetermined function. The method can further include sending a wireless charging signal for wireless charging of a device to be charged (also referred as charging device) after the wireless charging function is enabled, wherein the charging device refers to an intelligent device having a charging request.

For example, the step of sending a wireless charging signal for wireless charging of a charging device after the wireless charging function is enabled can further include, after the wireless charging function is enabled, when the current position of the mobile device and the distribution positions of the charging devices from the mobile device are within a preset range, sending a wireless charging signal for wireless charging of the charging devices.

Figure 1:
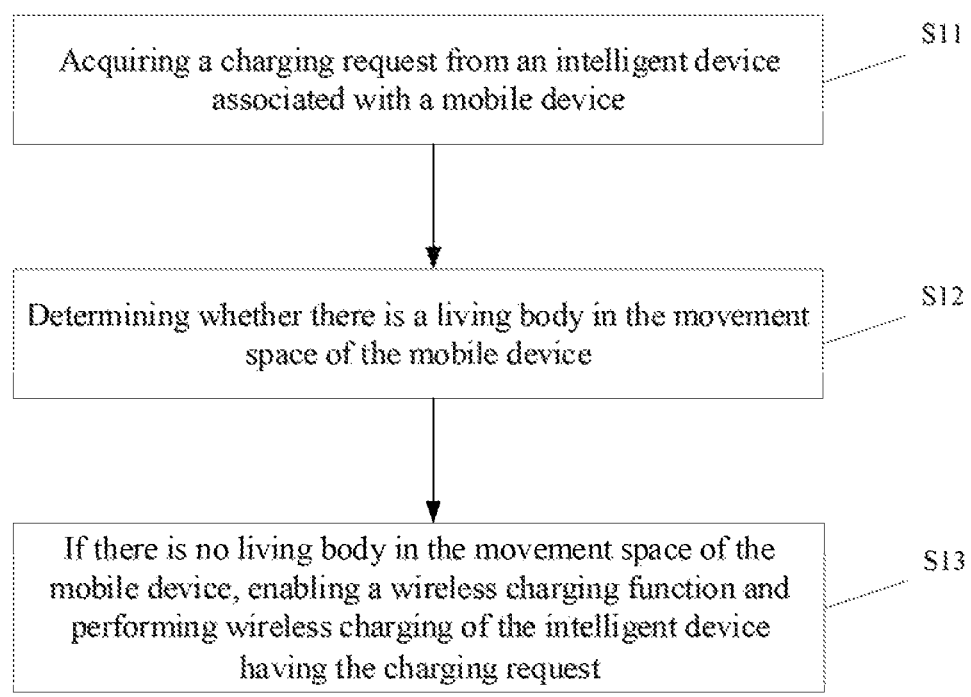
FIG. 1 is a flowchart of an information processing method according to an exemplary embodiment of the disclosure.

As illustrated in FIG. 1, the information processing method is applied to a mobile device including a movable chassis. The method can include the following operations.

At S11, a charging request is acquired from an intelligent device associated with the mobile device.

At S12, it is determined whether there is a living body in the movement space of the mobile device.

At S13, if there is no living body in the movement space of the mobile device, a wireless charging function is enabled to perform wireless charging of the intelligent device having the charging request.

In the embodiment of the disclosure, the movable chassis is mounted on the mobile device, the movable chassis is a movable device equipped with driving wheels, and the mobile device moves along with the movement of the movable chassis. The mobile device can include a mobile robot capable of playing voice, a floor cleaning robot or the like, which is not limited in the embodiment of the disclosure.

In the embodiment of the disclosure, the mobile device can execute a predetermined function in its movement process via the movable chassis. The predetermined function includes at least one of the following: a voice playing function; a floor cleaning function; or an image acquisition function.

For example, the mobile device is a floor cleaning robot, and the predetermined function is the floor cleaning function. However, in the embodiment of the disclosure, the predetermined function of the floor cleaning robot includes, but is not limited to at least the floor cleaning function.

It should be noted that in the embodiment of the disclosure, the mobile device may move according to a predetermined route. In the movement process of the mobile device, the environment can be sensed by a built-in sensor, so as to generate environment information of the space at which the mobile device is located and store the generated environment information. The environment information includes room size, information about where objects is positioned in the room and the like. Therefore, based on the environmental information, the movement route of the mobile device can be planned and stored, i.e., a predetermined route is stored.

For example, the mobile device is a floor cleaning robot. When the floor cleaning robot needs to perform a cleaning task, the sensed local environment information would be used by the floor cleaning robot to perform local environment construction and is compared or matched with the complete environment information. The position of the mobile device in its located space is determined by the mobile device based on the matching relationship between local environment information and the complete environment information, and the floor cleaning function is executed according to the predetermined route of the mobile device.

It should be noted that in the implementation of the disclosure, the way that the mobile device plans the movement route and performs the predetermined task is not limited to the method described above.

In operation S11 according to the embodiment of the disclosure, the mobile device acquires a charging request from an intelligent device associated with the mobile device. The intelligent device associated with the mobile device may be that the intelligent device establishes a communication connection with the mobile device based on a communication mode, such as Bluetooth, ZigBee, or near-field communication. The intelligent device being associated with the mobile device may also be that the intelligent device establishes a communication connection with the mobile device through a cloud device by connecting to the cloud device through the Wireless-Fidelity (Wi-Fi) technology. The cloud device refers to a device that manages the mobile device and the intelligent device, and the mobile device may also be connected to the cloud device through the Wi-Fi technology.

In one embodiment, when the mobile device and the intelligent device are associated based on the communication mode such as Bluetooth, ZigBee, or near-field communication, the operation S11 further includes, during movement of the mobile device via the movable chassis, receiving the charging request sent by the intelligent device associated with the mobile device.

In the embodiment, the predetermined function of the mobile device is a core execution function of the mobile device in the movement process, and the wireless charging function is an additional function based on convenience in the movement of the mobile device.

In another embodiment, when the mobile device and the intelligent device are associated through the cloud device, the operation S11 can further include sending a query message to a cloud device used for managing the mobile device and the intelligent device, wherein the query message is used to query whether there is an intelligent device having a charging demand, and receiving a response message fed back by the cloud device according to the query message, wherein the response message is used to indicate that the intelligent device associated with the mobile device has the charging request.

In the embodiment, the intelligent device having a charging demand or a charging request sends the charging demand or the charging request to the cloud device, and the cloud device feeds back the charging request to the mobile device in the form of a response message after receiving the query message of the mobile device. The response message carries identification information of the intelligent device having the charging demand, so that the mobile device can charge the intelligent device having the charging demand according to the identification information.

In operation S12 according to the embodiment of the disclosure, the mobile device determines whether there is a living body in its movement space, wherein the living body includes, for example, a human, or an animal.

In the case of a human, since electromagnetic radiation can be generated during the wireless charging process, in order to reduce the harm of electromagnetic radiation to people, the mobile device needs to determine whether there is a human body in the its movement space.

In one embodiment, the operation S12 further includes, in a movement process of the mobile device, detecting whether there is the living body within a predetermined distance from the mobile device as an origin through a built-in living body sensor, or receiving indication information used to indicate whether there is the living body in the movement space of the mobile device.

In the embodiment, in condition that a living body sensor is built in the mobile device, the mobile device may detect whether there is a living body within a predetermined distance from the mobile device as an origin during movement of the mobile device. In condition that the mobile device determines whether there is a living body in the movement space by receiving the indication information, the mobile device may receive the indication information sent by the cloud device. In addition, the mobile device may also receive the indication information sent by an IOT gateway device, which is not limited in the embodiment of the disclosure.

When the received indication information is sent by the cloud device, the cloud device manages all connected IOT devices in the space at which the mobile device is located. The cloud device may acquire whether there is a human body in the managed space through a human-body sensing device. For example, the human-body sensing device actively reports information about whether there is a human body in the located space of the mobile device to the cloud device. After acquiring the information, the cloud device will send or synchronize the acquired information to the mobile device, so that the mobile device receives the indication information sent by the cloud device.

In the embodiment of the disclosure, the cloud device may also acquire whether there is a human body in the managed space based on settings of a user terminal device, wherein the user terminal device is connected to the cloud device and can synchronize information to the cloud device. For example, the user terminal device is a smart phone. After the user leaves home, the user state is set to an out-of-home mode in the smart phone, and then startup information for the out-of-home mode will be synchronized and sent to the cloud device. After obtaining the startup information for the out-of-home mode, the cloud device immediately sends and synchronizes the information to the mobile device, so that the mobile device receives the indication information sent by the cloud device.

In addition, in the embodiment of the disclosure, the IOT gateway device is located in the same space as the IOT devices such as the mobile device and the charging device. The IOT gateway device has a management function for certain underlying node devices, and thus it can also receive indication information about whether there is a human body in the space, for example, reported by the human-body sensing device, and send the receive indication information to the mobile device.

In another embodiment, image information may also be acquired based on an image acquisition device in the space at which the mobile device is located, and whether there is a living body in the space at which the mobile device is located may be determined based on the acquired image information. After it is determined that there is no living body according to the image acquisition device, information is actively reported to the cloud device or the JOT gateway, and the cloud device or the IOT gateway sends the received information to the mobile device.

In operation S13 according to the embodiment of the disclosure, the mobile device, ater determining that there is no living body in the movement space of the mobile device, enables a wireless charging function and sends a wireless charging signal, so as to perform wireless charging of the intelligent device having the charging request. The wireless charging signal sent by the mobile device includes one of the following: a wireless charging radio-frequency signal; a wireless charging infrared signal; or a wireless charging ultrasonic signal.

It should be noted that in the embodiment of the disclosure, the mobile device that serves as a wireless charging transmitter and the intelligent device having the charging demand that serves as a wireless charging receiver perform a wireless charging process based on a predetermined wireless charging protocol. The predetermined wireless charging protocol is formulated based on different wireless charging signals.

In the embodiment of the disclosure, the mobile device and the intelligent device having the charging demand may adopt any one of the following charging modes: a radio-frequency wireless charging mode, an infrared wireless charging mode or an ultrasonic wireless charging mode. Therefore, the mobile device can transmit any one of the wireless charging radio-frequency signal, wireless charging infrared signal or wireless charging ultrasonic signal in the movement process.

In the above wireless charging mode, the radio-frequency wireless charging mode can realize charging within a three-dimensional space without being limited by any angle, and thus the radio-frequency wireless charging mode is preferred according to the needs. When the radio-frequency wireless charging mode is adopted, it is necessary for the mobile device and the intelligent device having the charging demand to mount radio-frequency antennas to send and receive radio-frequency charging signals. The radio-frequency charging signals are signals sent based on radio-frequency bands.

However, it should be noted that since receiving of the wireless charging signal can be limited by distances, the mobile device, in the movement process, only charges the charging device within a range of distance at which the wireless charging signal can be received.

Exemplarily, during charging based on the radio-frequency wireless charging mode, wireless charging of the charging device can be realized only when the charging device is within a three-dimensional space range of 1.5 m from the mobile device.

In addition, in the embodiment of the disclosure, the mobile device includes a movable chassis and a housing mounted on the movable chassis, and the wireless charging module such as the radio-frequency antenna may be mounted at the rotation center on the surface of the housing, so as to ensure a wider coverage of the wireless charging signal during movement of the mobile device.

In one embodiment, the mobile device may further monitor its own battery level information. When the battery level information does not meet a preset battery level threshold, the wireless charging function is not enabled during movement of the mobile device. In this way, execution of the predetermined function is ensured. For example, when it is determined, according to the completion of the predetermined function, that the current battery level is not enough to support the completion of the predetermined function, or only the predetermined function can be completed, the wireless charging function is not enabled.

Further, if the charging request is not received by the mobile device, or there is a living body in the movement space of the mobile device, the mobile device does not enable the wireless charging function during its movement process.

In the embodiment of the disclosure, the mobile device enables the wireless charging function in the movement process only when the charging request is acquired and it is determined that there is no living body in the movement space, and does not enable the wireless charging function when the charging request is not acquired or there is a living body in the movement space of the mobile device, so as to reduce the power consumption of the mobile device.

Additionally, when the wireless charging function is not enabled, the mobile device moves according to a first movement parameter; and when the wireless charging function is enabled, the movement parameter is updated from the first movement parameter to a second movement parameter, where a value of the second movement parameter is smaller than that of the first movement parameter.

In the embodiment, the value of the first movement parameter or the second movement parameter may be a moving speed, or the number of intelligent devices having charging requests that the mobile route of the mobile device passes by.

In the case of the moving speed, after the wireless charging function is enabled, the moving speed of the mobile device may affect the sending and receiving of the signal in the wireless charging process. When the mobile device moves too fast, the wireless charging signal sent by the mobile device cannot be effectively received by the charging devices, so that the charging power for the charging devices cannot be guaranteed. In addition, when the mobile device moves too fast, it is also unfavorable for the stability in sending and receiving of the wireless charging signal. In view of this, a first moving speed may be switched to a relatively reduced second moving speed after the wireless charging function is enabled.

In one embodiment, the mobile device records and updates the number of intelligent devices having charging requests in the movement process. In the embodiment of the disclosure, the number of intelligent devices having charging requests may be recorded and updated by the mobile device in its movement process, so that the movement route can be re-planned or readjusted to cover more intelligent devices having charging requests.

In the case of the floor cleaning robot, the floor cleaning robot determines and updates, according to the stored environmental information of the space at which the floor cleaning robot is located, a movement route capable of covering more intelligent devices having charging requests, wherein the movement route uses the position at which the floor cleaning robot is located as an origin. In this way, the floor cleaning robot can charge more intelligent devices having charging requests by utilizing its mobility advantage.

In one embodiment, the mobile device can acquire the distribution position of at least one intelligent device having a charging request; determine the current position of the mobile device; and correspondingly, after the wireless charging function is enabled, when the current position of the mobile device and the distribution position of the at least one intelligent device having the charging request are within a preset range, send the wireless charging signal for wireless charging of the device to be charged.

In the embodiment, since the wireless charging signal is restricted by the distance, the mobile device may also selectively send the wireless charging signal based on the preset range according to the acquired distribution position of the intelligent device having the charging request and the current position of the mobile device, so as to improve the effectiveness of sending the wireless charging signal.

It can be understood that in the embodiment of the disclosure, under the situation that there is no living body in the movement space, the mobile device enables the wireless charging function to perform wireless charging of the at least one intelligent device having the charging request, and thus the mobility advantage of the mobile device is fully used. On one hand, the cost is reduced, the convenience in charging is improved, and the living body in the movement space is not affected in the charging process of the intelligent device. On the other hand, the functions of the mobile device are enriched and the practicability of the mobile device is improved.

For example, the mobile device is a floor cleaning robot and the charging device is an intelligent voice device. Radio-frequency charging antennas are mounted in both the ground cleaning robots and the intelligent voice device. The intelligent voice device is positioned within a height range of 1.5 m to the ground.

Figure 2:
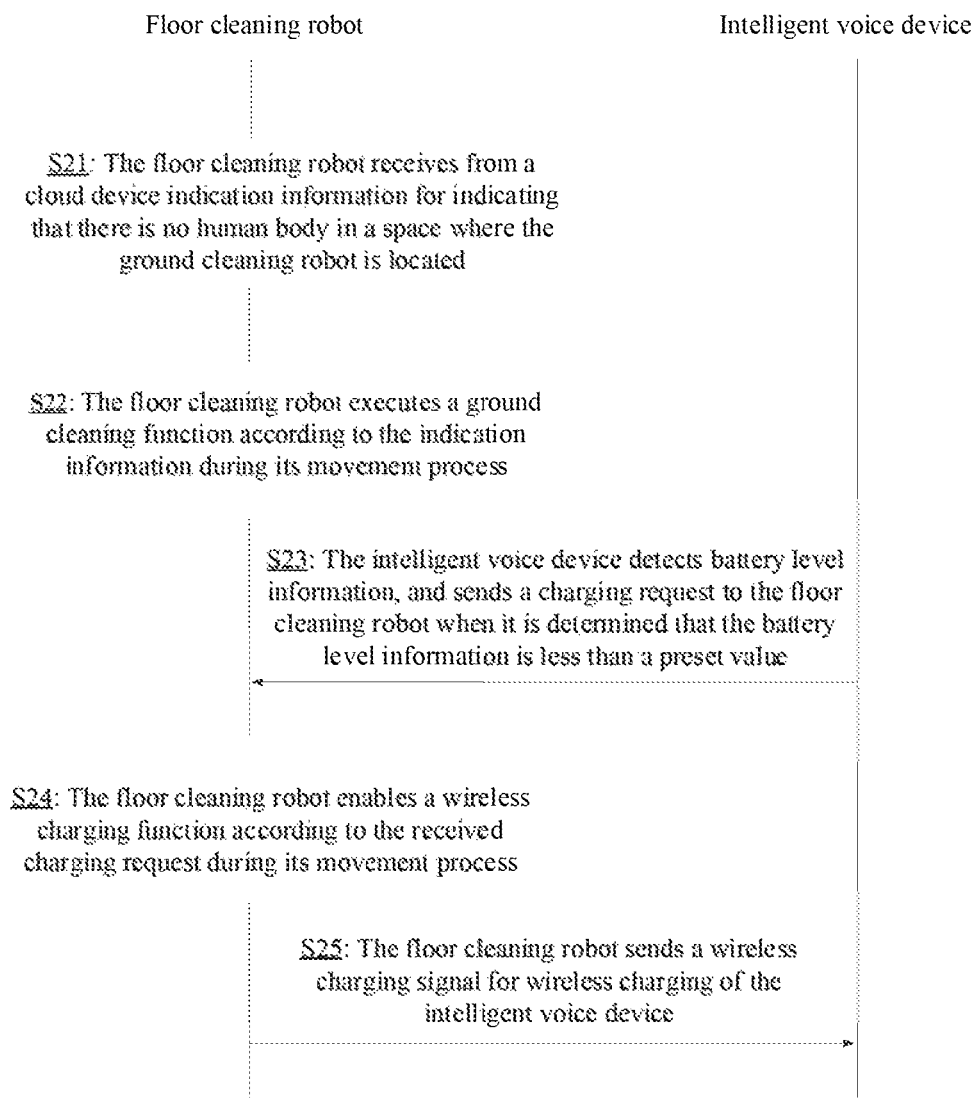
FIG. 2 is a flowchart of an information processing method according to an exemplary embodiment of the disclosure.

FIG. 2 is an exemplary flowchart of an information processing method according to one embodiment of the disclosure. As illustrated in FIG. 2, the information processing method can be applied to a floor cleaning robot and include the following operations.

In S21, the floor cleaning robot receives from a cloud device indication information used for indicating that there is no human body in a space at which the ground cleaning robot is located.

In S22, the floor cleaning robot executes a floor cleaning function in its movement process according to the indication information.

In S23, the intelligent voice device detects battery level information, and sends a charging demand to the ground cleaning robot when it is determined that the battery level information is less than a preset value.

In S24, the floor cleaning robot enables a wireless charging function according to the received charging demand in the movement process.

In S25, the floor cleaning robot sends a wireless charging signal for wireless charging of the intelligent voice device.

It can be understood that in the embodiment of the disclosure, in the process that the floor cleaning robot moves to execute the floor cleaning function, based on the charging demand of the intelligent voice device, when there is no human body in the space where the ground cleaning robot is located, the wireless charging function is enabled by the floor cleaning robot to perform wireless charging of the intelligent voice device, which provides convenience for satisfying the charging demand of the intelligent voice device. Accordingly, the functions of the floor cleaning robot are enriched and the practicability of the floor cleaning robot is improved.

Figure 3:
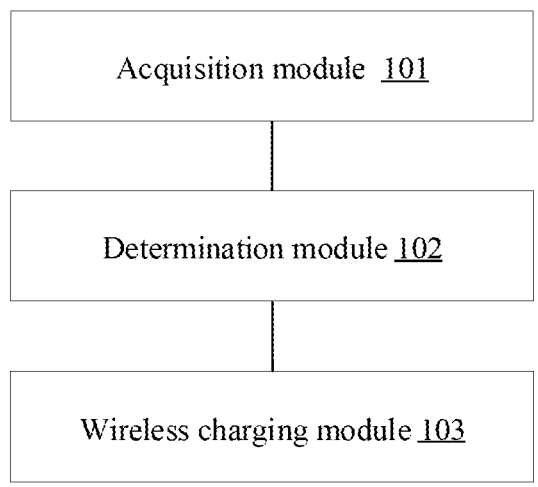
FIG. 3 is a diagram of an information processing apparatus according to one exemplary embodiment of the disclosure.

FIG. 3 is a diagram of an information processing apparatus according to one exemplary embodiment of the disclosure. Referring to FIG. 3, the information processing apparatus is applied to a mobile device including a movable chassis. As shown, the apparatus can include an acquisition module 101 that is configured to acquire a charging request from an intelligent device associated with the mobile device and a determination module 102 configured to determine whether there is a living body in the movement space of the mobile device The apparatus can further include a wireless charging module 103 that is configured to, responsive to determining that there is no living body in the movement space of the mobile device, enable a wireless charging function and perform wireless charging of the intelligent device having the charging request.

In some embodiments of the disclosure, the determination module 102 is specifically configured to detect, during movement of the mobile device, whether there is the living body within a predetermined distance from the mobile device as an origin through a built-in living body sensor; or receive indication information used to indicate whether there is the living body in the movement space of the mobile device.

In some embodiments of the disclosure, the device can further include a movement module 104 that is configured to move according to a first movement parameter when the wireless charging function is not enabled and update a movement parameter of the mobile device from the first movement parameter to a second movement parameter when the wireless charging function is enabled, where a value of the second movement parameter is smaller than that of the first movement parameter.

In some embodiments of the disclosure, the device further includes a recording module 105 that is configured to record and update the number of intelligent devices having the charging requests during movement of the mobile device.

In some embodiments of the disclosure, the acquisition module is specifically configured to receive, during movement of the mobile device via the movable chassis, the charging request sent by the intelligent device associated with the mobile device.

In some embodiments of the disclosure, the acquisition module 101 is specifically configured to send a query message to a cloud device managing the mobile device and the intelligent device, where the query message is used to query whether there is an intelligent device having a charging demand. Further, it can receive a response message fed back by the cloud device according to the query message, where the response message is used to indicate that the intelligent device associated with the mobile device has the charging request.

Regarding the apparatus in the above embodiment, the specific manner that each module performs the operation has been described in detail in the embodiments of the method, and will not be elaborated herein.

Figure 4:
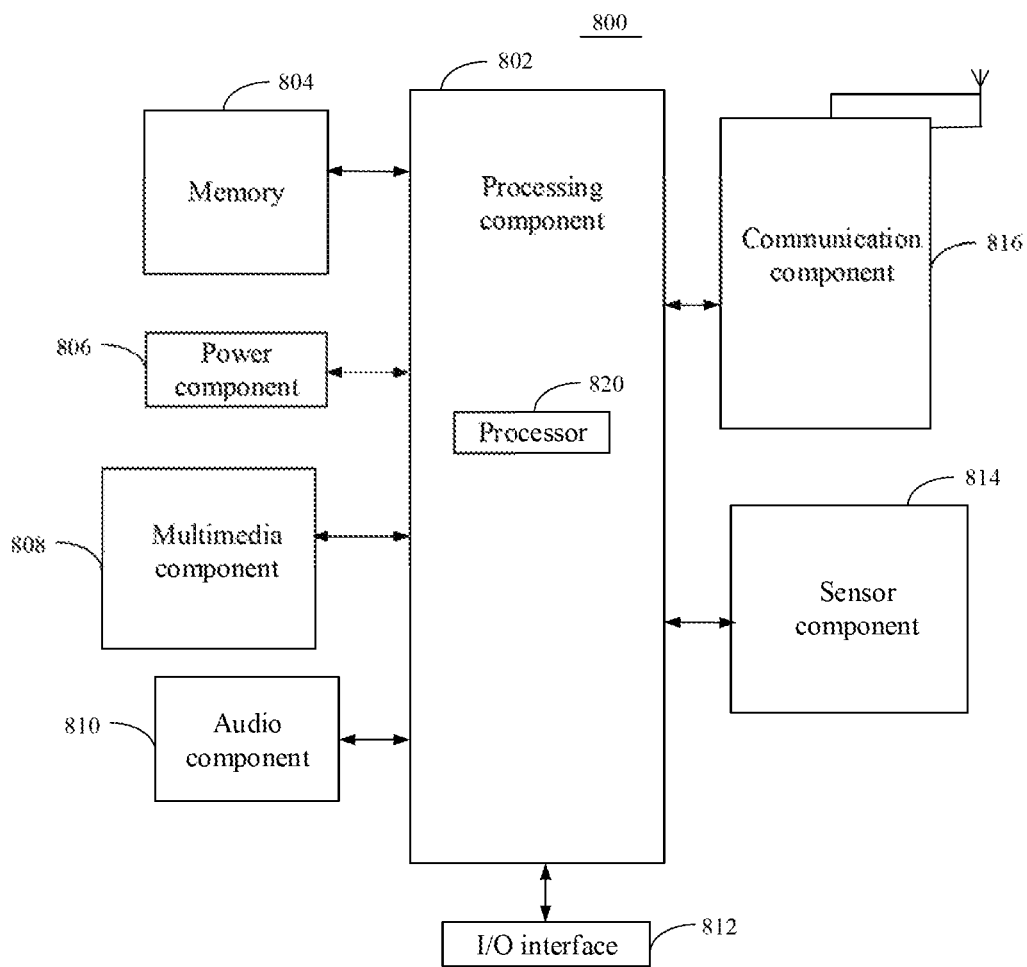
FIG. 4 is a diagram of a mobile device according to one exemplary embodiment of the disclosure.

FIG. 4 is a diagram of a mobile device according to one exemplary embodiment of the disclosure. For example, the mobile device 800 may be a mobile phone, a mobile computer, and the like.

Referring to FIG. 4, the mobile device 800 may include one or a plurality of the following components: a processing component 802, a memory 804, a power supply component 806, a multimedia component 808, an audio component 810, an input/output (I/O) interface 812, a sensor component 814 and a communication component 816.

The processing component 802 generally controls the overall operation of the mobile device 800, such as operations associated with display, telephone call, data communication, camera operation and recording operation. The processing component 802 may include one or more processors 820 to execute instructions to complete all or part of the operations of the method as described above. In addition, the processing component 802 may include one or more modules to facilitate the interactions between the processing component 802 and other components. For example, the processing component 802 may include a multimedia module to facilitate the interactions between the multimedia component 808 and the processing component 802.

The memory 804 is configured to store various types of data to support the operations on the mobile device 800. Examples of the data include instructions of any application or method operated on the mobile device 800, contact data, phonebook data, messages, pictures, videos, and the like. The memory 804 may be implemented by any type of volatile or non-volatile memory devices or combinations thereof, such as Static Random Access Memory (SRAM), Electrically Erasable Programmable Read Only Memory (EEPROM), Erasable Programmable Read Only Memory (EPROM), Programmable Read Only Memory (PROM), Read Only Memory (ROM), magnetic memory, flash memory, magnetic disk or compact disk.

The power supply component 806 supplies power to various components of the mobile device 800. The power supply component 806 may include a power management system, one or more power supplies, and other components associated with generating, managing, and distributing power for the mobile device 800.

The multimedia component 808 includes a screen providing an output interface between the device 800 and the user. In some embodiments, the screen may include a Liquid Crystal Display (LCD) and a Touch Panel (TP). If the screen includes a touch panel, the screen may be implemented as a touch screen to receive input signals from the user. The touch panel includes one or more touch sensors to sense touch, slide, and gestures on the touch panel. The touch sensor can not only sense the boundary of a touch or slide action, but also detect the duration and pressure related to the touch or slide operation. In some embodiments, the multimedia component 808 includes a front camera and/or a rear camera. When the device 800 is in an operation mode, such as shooting mode or video mode, the front camera and/or the rear camera can receive external multimedia data. Each of the front camera and the rear camera may be a fixed optical lens system or have a focal length and an optical zooming ability.

The audio component 810 is configured to output and/or input audio signals. For example, the audio component 810 includes a microphone (MIC) configured to receive external audio signals when the mobile device 800 is in an operation mode, such as a call mode, a recording mode and a voice recognition mode. The received audio signals may be further stored in the memory 804 or sent via the communication component 816. In some embodiments, the audio component 810 further includes a speaker used to output audio signals.

The I/O interface 812 provides an interface between the processing component 802 and a peripheral interface module. The peripheral interface module may be a keyboard, a click wheel, buttons, etc. These buttons may include, but are not limited to, Home button, volume button, start button, and lock button.

The sensor component 814 includes one or more sensors used to provide various aspects of state evaluation for the mobile device 800. For example, the sensor component 814 can detect the on/off state of the mobile device 800, and the relative positioning of the components, such as the display and keypad of the mobile device 800. The sensor component 814 can also detect the position change of the mobile device 800 or one component of the device 800, the existence or nonexistence of the user's contact with the mobile device 800, the orientation or acceleration/deceleration of the mobile device 800, and the temperature change of the mobile device 800. The sensor component 814 may include a proximity sensor configured to detect the existence of nearby objects under the situation of no physical contact.

The sensor component 814 may also include an optical sensor, such as a CMOS or CCD image sensor, for use in imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between the mobile device 800 and other devices. The mobile device 800 may access to wireless networks based on communication standards, such as Wi-Fi, 2G or 3G, or a combination thereof. In one exemplary embodiment, the communication component 816 receives broadcast signals or broadcast related information from an external broadcast management system via a broadcast channel. In one exemplary embodiment, the communication component 816 may also include a Near-Field Communication (NFC) module to facilitate short-range communication. For example, the NFC module may be implemented based on Radio-Frequency Identification (RFID), Infrared Data Association (IrDA), Ultra Wide Band (UWB), Bluetooth (BT), and other technologies.

In one exemplary embodiment, the mobile device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic elements for executing the method described above.

In one exemplary embodiment, the disclosure further provides a non-transitory computer-readable storage medium including instructions, such as the memory 804 including instructions, where the instructions may be executed by the processor 820 of the mobile device 800 to complete the abovementioned method. For example, the non-transitory computer-readable storage medium may be an ROM, a Random Access Memory (RAM), a CD-ROM, a magnetic tape, a son disk, an optical data storage device, and the like.

Provided are a non-transitory computer-readable storage medium, having stored therein instructions that, when executed by the processor of the mobile device, enable the mobile device including an optical fingerprint acquisition module and a display screen to implement the information processing method. The method can include acquiring a charging request from an intelligent device associated with the mobile device, determining whether there is a living body in the movement space of the mobile device, and responsive to determining no living body is in the movement space of the mobile device, enabling a wireless charging function to perform wireless charging of the intelligent device having the charging request.

After considering the description and practicing the invention disclosed herein, those skilled in the art can easily conceive of other embodiments of the disclosure. The disclosure is intended to cover any variations, uses or adaptive changes of the disclosure, which follow the general principles of the disclosure and include common general knowledge or frequently used technical means in the technical field not disclosed in the disclosure. The description and the embodiment are only regarded as exemplary, and the true scope and spirit of the disclosure are indicated by the following claims.

It should be understood that the disclosure is not limited to the precise structure described above and illustrated in the accompanying drawings, and that various modifications and changes may be made without departing from the scope of the disclosure. The scope of the disclosure is limited only by the appended claims.

The invention claimed is:

1. An information processing method that is applied to a mobile device having a movable chassis, the method comprising:
   acquiring a charging request from an intelligent device associated with the mobile device;
   determining whether a living body is within a movement space of the mobile device;
   enabling, responsive to determining that no living body is within the movement space of the mobile device, a wireless charging function and performing wireless charging of the intelligent device having the charging request,
   wherein the method further comprises:
   moving according to a first movement parameter when the wireless charging function is not enabled; and
   updating the first movement parameter to a second movement parameter when the wireless charging function is enabled,
   wherein a value of the second movement parameter is less than that of the first movement parameter.

2. The method of claim 1, wherein determining whether the living body is within the movement space of the mobile device further comprises:
   detecting, during movement of the mobile device, whether the living body is within a predetermined distance from the mobile device as an origin through a built-in living body sensor; or
   receiving indication information used for indicating whether the living body is within the movement space of the mobile device.

3. The method of claim 1, further comprising:
   recording and updating, during movement of the mobile device, a number of intelligent devices having charging requests.

4. The method of claim 1, wherein acquiring the charging request from the intelligent device associated with the mobile device further comprises:
   receiving, during movement of the mobile device via the movable chassis, the charging request sent by the intelligent device associated with the mobile device.

5. The method of claim 1, wherein acquiring the charging request from the intelligent device associated with the mobile device further comprises:
   sending a query message to a cloud device used for managing the mobile device and the intelligent device, the query message being used to query whether there is an intelligent device having a charging request; and
   receiving a response message from the cloud device according to the query message, the response message being used to indicate that the intelligent device associated with the mobile device has the charging request.

6. The method of claim 1, wherein performing wireless charging of the intelligent device having the charging request further comprises:
   performing wireless charging of the intelligent device having the charging request by using at least one of the following charging modes:
   a radio-frequency wireless charging mode,
   an infrared wireless charging mode, and
   an ultrasonic wireless charging mode.

7. A mobile device, comprising:
a processor, and
a memory that is configured to store instructions executable by the processor,
wherein the processor is configured to:
acquire a charging request from an intelligent device associated with the mobile device,
determine whether a living body is within a movement space of the mobile device, and
enable, responsive to determining that no living body is within the movement space of the mobile device, a wireless charging function and perform wireless charging of the intelligent device having the charging request;
wherein the processor is further configured to:
control the mobile device to move according to a first movement parameter when the wireless charging function is not enabled; and
update the first movement parameter to a second movement parameter when the wireless charging function is enabled, wherein a value of the second movement parameter is less than that of the first movement parameter.

8. The mobile device of claim 7, further comprising an Input/Output (I/O) interface, and the processor is further configured to:
detect, during movement of the mobile device, whether the living body is within a predetermined distance from the mobile device as an origin through a built-in living body sensor; or
receive, through the I/O interface, indication information for indicating whether the living body is within the movement space of the mobile device.

9. The mobile device of claim 7, wherein the processor is further configured to:
record and update, during movement of the mobile device, a number of intelligent devices having charging requests.

10. The mobile device of claim 7, wherein the processor is further configured to:
receive, during movement of the mobile device via the movable chassis, the charging request sent by the intelligent device associated with the mobile device through the I/O interface.

11. The mobile device of claim 7, wherein the processor is further configured to:
send, through the I/O interface, a query message to a cloud device used for managing the mobile device and the intelligent device, the query message being used to query whether there is an intelligent device having a charging request; and
receive, through the I/O interface, a response message from the cloud device according to the query message, the response message being used to indicate that the intelligent device associated with the mobile device has the charging request.

12. The mobile device of claim 7, wherein the processor is configured to perform wireless charging of the intelligent device having the charging request by using at least one of the following charging modes: a radio-frequency wireless charging mode, an infrared wireless charging mode, and an ultrasonic wireless charging mode.

13. A non-transitory computer-readable storage medium having stored thereon instructions that, when executed by a processor in a mobile device, enable the mobile device to implement an information processing method, the method comprising:
acquiring a charging request from an intelligent device associated with the mobile device;
determining whether a living body is within a movement space of the mobile device;
enabling, responsive to determining that no living body is within the movement space of the mobile device, a wireless charging function and performing wireless charging of the intelligent device having the charging request;
wherein the method further comprises:
moving according to a first movement parameter when the wireless charging function is not enabled; and
updating the first movement parameter to a second movement parameter when the wireless charging function is enabled,
wherein a value of the second movement parameter is less than that of the first movement parameter.

14. The non-transitory computer-readable storage medium of claim 13, wherein determining whether the living body is within the movement space of the mobile device further comprises:
detecting, during movement of the mobile device, whether the living body is within a predetermined distance from the mobile device as an origin through a built-in living body sensor; or
receiving indication information used for indicating whether the living body is within the movement space of the mobile device.

15. The non-transitory computer-readable storage medium of claim 13, further comprising:
recording and updating, during movement of the mobile device, a number of intelligent devices having charging requests.

16. The non-transitory computer-readable storage medium of claim 13, wherein acquiring the charging request from the intelligent device associated with the mobile device further comprises:
receiving, during movement of the mobile device via a movable chassis, the charging request sent by the intelligent device associated with the mobile device.

17. The non-transitory computer-readable storage medium of claim 13, wherein acquiring the charging request from the intelligent device associated with the mobile device further comprises:
sending a query message to a cloud device used for managing the mobile device and the intelligent device, the query message being used to query whether there is an intelligent device having a charging request; and
receiving a response message from the cloud device according to the query message, the response message being used to indicate that the intelligent device associated with the mobile device has the charging request.

* * * * *

UNITED STATES PATENT AND TRADEMARK OFFICE
CERTIFICATE OF CORRECTION

| | |
|---|---|
| PATENT NO. | : 11,398,746 B2 |
| APPLICATION NO. | : 16/848127 |
| DATED | : July 26, 2022 |
| INVENTOR(S) | : Chengping Hua et al. |

It is certified that error appears in the above-identified patent and that said Letters Patent is hereby corrected as shown below:

On the Title Page

Item (30), the Foreign Application Priority Data has been omitted. Item (30) should read:
-- (30) Foreign Application Priority Data
Nov. 20, 2019 (CN) ................201911144282.1 --

Signed and Sealed this
Sixth Day of September, 2022

Katherine Kelly Vidal
*Director of the United States Patent and Trademark Office*